United States Patent
Sun et al.

(10) Patent No.: US 8,884,292 B2
(45) Date of Patent: Nov. 11, 2014

(54) TRANSFLECTIVE TFT-LCD AND METHOD FOR MANUFACTURING THE SAME

(75) Inventors: Rongge Sun, Beijing (CN); Xiujian Zhu, Beijing (CN); Guangyan Tian, Beijing (CN)

(73) Assignees: Boe Technology Group Co., Ltd., Beijing (CN); Hefei Xinsheng Optoelectronics Technology Co., Ltd., Hefei, Anhui Province (CN)

( * ) Notice: Subject to any disclaimer, the term of this patent is extended or adjusted under 35 U.S.C. 154(b) by 30 days.

(21) Appl. No.: 13/338,474

(22) Filed: Dec. 28, 2011

(65) Prior Publication Data
US 2012/0168760 A1 Jul. 5, 2012

(30) Foreign Application Priority Data
Dec. 31, 2010 (CN) .......................... 2010 1 0620095

(51) Int. Cl.
| | | |
|---|---|---|
| H01L 29/04 | (2006.01) |
| H01L 29/10 | (2006.01) |
| H01L 31/00 | (2006.01) |
| G02F 1/1343 | (2006.01) |
| G02F 1/1335 | (2006.01) |

(52) U.S. Cl.
CPC .... G02F 1/133555 (2013.01); G02F 1/134363 (2013.01)
USPC 257/59; 257/72; 257/E33.053; 257/E33.072; 438/29; 438/30

(58) Field of Classification Search
CPC ............... G02F 1/133555; G02F 1/136227; H01L 27/1214; H01L 27/12; H01L 33/12; H01L 33/32; H01L 21/0242; H01L 21/02433; H01L 21/02458; H01L 21/0254; H01L 21/02642; H01L 21/02647; H01L 21/318; H01L 2251/306; H01L 2251/308; H03H 9/02094; H03H 9/175
USPC ......... 257/59, 72, E33.053, E33.072; 438/29, 438/30, 149
See application file for complete search history.

(56) References Cited

U.S. PATENT DOCUMENTS

| | | |
|---|---|---|
| 6,295,109 B1 | 9/2001 | Kubo et al. |
| 6,614,496 B1 | 9/2003 | Song et al. |

(Continued)

FOREIGN PATENT DOCUMENTS

CN 101470309 A 7/2009

OTHER PUBLICATIONS

Chinese First Office Action dated Sep. 2, 2013: Appln. No. 201010620095.9.

(Continued)

*Primary Examiner* — Michelle Mandala
(74) *Attorney, Agent, or Firm* — Ladas & Parry LLP

(57) ABSTRACT

Embodiments of the disclosed technology provide a transflective transistor thin film array substrate and a method for manufacturing the same. The transflective thin film transistor array substrate, comprising pixel units defined by gate lines and data lines, and each pixel unit comprises a thin film transistor and a common electrode and is divided into a reflective region and a transmissive region. The reflective region comprises a reflective electrode and a second pixel electrode of the reflective region, the transmissive region comprises first and second pixel electrodes of the transmissive region, and the second pixel electrode of the reflective region and the first and second pixel electrodes of the transmissive region are provided in one pixel electrode layer.

7 Claims, 4 Drawing Sheets

(56) References Cited

U.S. PATENT DOCUMENTS

| | | |
|---|---|---|
| 7,480,015 B2 * | 1/2009 | Kim et al. .................. 349/43 |
| 2007/0109455 A1 | 5/2007 | Kim et al. |
| 2007/0171340 A1 | 7/2007 | Lee |
| 2007/0200985 A1 * | 8/2007 | Kaneko et al. ............. 349/114 |
| 2009/0284693 A1 | 11/2009 | Adachi et al. |
| 2010/0055817 A1 * | 3/2010 | Song et al. ................. 438/30 |
| 2010/0296041 A1 | 11/2010 | Kimura et al. |
| 2011/0032460 A1 * | 2/2011 | Lee et al. .................. 349/114 |

OTHER PUBLICATIONS

First Chinese Office Action dated Dec. 4, 2013; Appln. No. 201110003288.4.

Chinese Rejection Decision dated Feb. 13, 2014; Appln. No. 201010620095.9.

Second Chinese Office Action dated Jun. 5, 2014; Appln. No. 201110003288.4.

* cited by examiner

RA, reflective region     TA, transmissive region

TRANSFLECTIVE TFT-LCD AND METHOD FOR MANUFACTURING THE SAME

BACKGROUND

Embodiments of the disclosed technology relate to a transflective thin film transistor array substrate and a method for manufacturing the same.

Among thin film transistor liquid crystal displays (TFT-LCDs), planar electric field type TFT-LCDs take advantageous of wide view angle, low color difference, high light transmission, or the like and therefore have been applied more and more popularly.

As other types of TFT-LCD, a planar electric field type TFT-LCD is also manufactured by bonding a color filter substrate and an array substrate together with liquid crystal layer interposed therebetween. In the related art, as shown in FIGS. 1-2, gate lines 203 and data lines 204 perpendicular to the gate lines 203 are formed on the array substrate of a planar electric field type transflective TFT-LCD; pixel units 202 are defined by the gate lines 203 and the data lines 204, and each has a reflective region comprising a reflective electrode 212 and a second pixel electrode 201 of the reflective region and a transmissive region comprising a first pixel electrode 211 of the transmissive region and a second pixel electrode 201' of the transmissive region, and a first insulating layer 213 and a second insulating layer 214 are sandwiched between the reflective electrode 212 and the second pixel electrode 201 of the reflective region and between the first pixel electrode 211 of the transmissive region and the second pixel electrode 201' of the transmissive region.

During manufacturing the above planar electric field type TFT-LCD array substrate, the first pixel electrode 211 of the transmissive region of each pixel unit is firstly formed by a first patterning process; then the gate lines 203 and the reflective electrode 212 of each pixel unit are formed by a second patterning process; drain electrodes 206, source electrodes 207, and the data lines 204 are formed by a third patterning process after depositing the first insulating layer 213; drain contact holes 208 are formed by a fourth patterning process; and the second pixel electrodes 201 of the reflective region and the second pixel electrodes 201' of the transmissive region of each pixel unit are formed by a fifth patterning process.

As above described, the planar electric field type TFT-LCD array substrate is formed by five patterning processes. Thus, the manufacturing process is complicated, and the production cost is high.

SUMMARY

An embodiment of the disclosed technology provides a transflective thin film transistor array substrate, comprising a base substrate, first and second metal layers on the base substrate, and a first insulating layer disposed between the first and second metal layers. The first metal layer comprises gate lines, the second metal layer comprises data lines perpendicular to the gate lines, pixel units are defined by the gate lines and the data lines, and each pixel unit comprises a thin film transistor and a common electrode and is divided into a reflective region and a transmissive region; the reflective region comprises a reflective electrode and a second pixel electrode of the reflective region, the transmissive region comprises first and second pixel electrodes of the transmissive region, and the second pixel electrode of the reflective region and the first and second pixel electrodes of the transmissive region are provided in one pixel electrode layer.

Another embodiment of the disclosed technology provides a method for manufacturing a transflective transistor thin film array substrate, each pixel unit of the array substrate comprising a transmissive region and a reflective region, the method comprising: depositing a metal thin film on a base substrate and patterning the metal thin film to form a reflective electrode of the reflective region of each pixel unit; forming a second pixel electrode of the reflective region and first and second pixel electrodes of the transmissive region on the base substrate on which the reflective electrode of the reflective region has been formed, the second pixel electrode of the reflective region and the first and second pixel electrodes of the transmissive region are provided in one pixel electrode layer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

In order to more clearly describe embodiments of the disclosed technology or solutions in the related art, drawings for showing the embodiments and the related art are simply described hereinafter. Apparently, the following described drawings illustrate some embodiments of the disclosed technology; those skilled in the art can obtain other drawings based on these drawings disclosed herein without mental work fall.

DETAILED DESCRIPTION

Transflective thin film transistor (TFT) array substrates provided in embodiments of the disclosed technology now will be described in detail hereinafter with reference to the accompanying drawings.

It should be understood that the described embodiments are only a part of embodiments, but not all embodiments of the disclosed technology. All of other embodiments made by those skilled in the art based on embodiments disclosed herein without inventive work should fall within the scope of the disclosed technology.

Figure 3:
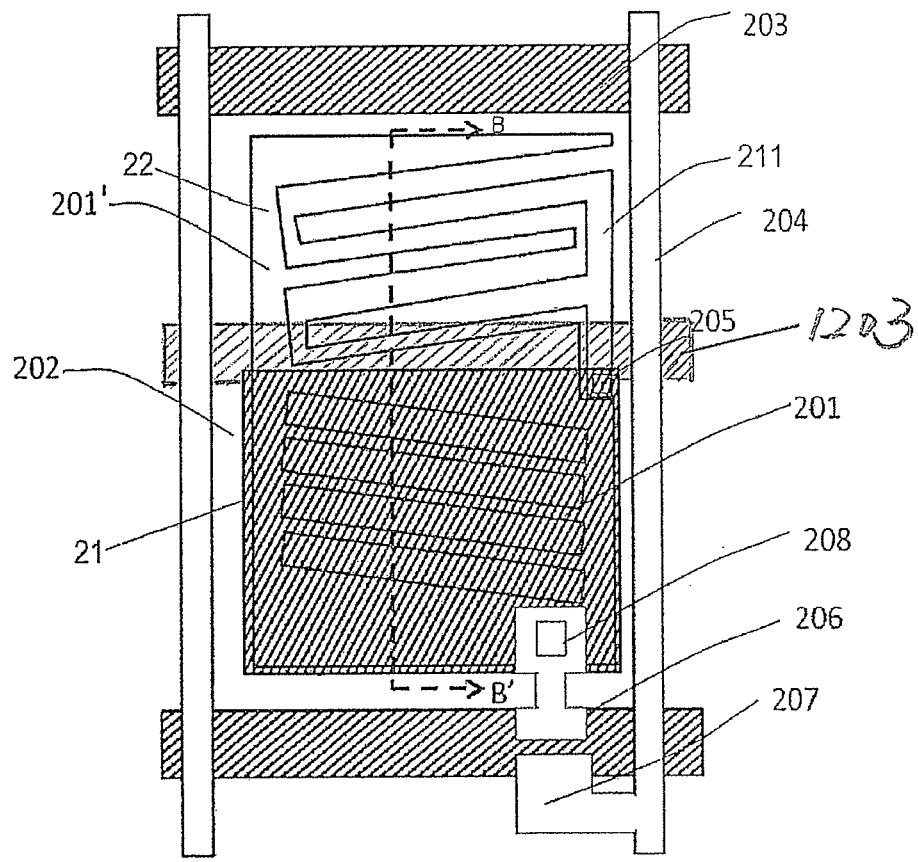
FIG. 3 is a flat schematic view of a transflective TFT array substrate according to an embodiment of the disclosed technology.
Figure 4:
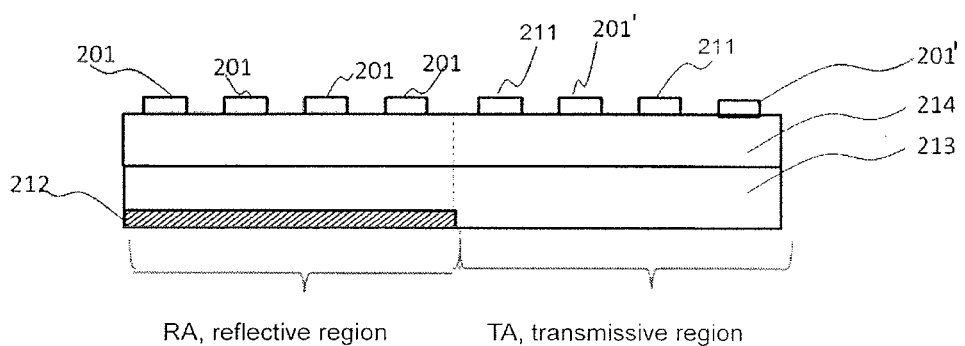
FIG. 4 is a cross-sectional view taken along line B-B' in FIG. 3.

FIG. 3 is a flat schematic view a transflective TFT array substrate according to an embodiment of the disclosed technology, and FIG. 4 is a cross-sectional view taken along line B-B' in FIG. 3. It should be understood that FIG. 3 only shows a portion of the transflective TFT array substrate of the present embodiment, those skilled in the art can understand that the TFT array substrate comprises a plurality of the same portions as shown in FIG. 3, and the present embodiment only describes this portion for illustration purpose.

Referring to FIGS. 3 and 4, the transflective TFT array substrate according to the embodiment of the disclosed technology comprises a base substrate (e.g., a glass or plastic base substrate, not shown); and a first metal layer and a second metal layer are provided on the base substrate with a first insulating layer 213 sandwiched therebetween. Gate lines 203 are formed in the first metal layer, data lines 204 are perpendicular to the gate lines 203 and formed in the second metal layer, and pixel units 202 are defined by the gate lines 203 and the data lines 204 and each comprises a TFT and a common electrode 1203 for applying a common voltage (not shown). The common electrodes are formed in the first metal layer, and may be parallel with the gate lines 203. The pixel units 202 each comprise a reflective region 21 and a transmissive region 22, which are provided side by side.

In each pixel unit, the reflective region 21 comprises a reflective electrode 212 and a second pixel electrode 201 of the reflective region, and the transmissive region 22 comprises a first pixel electrode 211 of the transmissive region and a second pixel electrode 201' of the transmissive region.

The second pixel electrode 201 of the reflective region, the first pixel electrode 211 of the transmissive region, and the second pixel electrode 201' of the transmissive region are provided in a same layer, which can be referred to as "pixel electrode layer."

In the present embodiment, the reflective electrode 212 is disposed in the first metal layer, that is, located in the same layer as the gate lines 203 and the common electrodes, and is also connected with a corresponding common electrode. The pixel electrode layer is located above the second metal layer with a second insulating layer 214 disposed therebetween.

In the transflective TFT array substrate according to the present embodiment, since the first pixel electrode 211 of the transmissive region and the second pixel electrode 201' of the transmissive region are located in the same layer, that is, can be simultaneously formed by one patterning process, so the entire preparation progress may be completed by four patterning processes. For example, the gate lines 203, gate electrodes, the reflective electrodes 212, and the common electrodes are formed by a first patterning progress; the data lines 204, drain electrodes 206, and source electrodes 207 are formed by a second patterning progress; drain contact holes 204 and common electrode contact holes 205 are formed by a third patterning progress; and the second pixel electrodes 201 of the reflective region, the first pixel electrodes 211 of the transmissive region, and the second pixel electrodes 201' of the transmissive region are formed by a fourth patterning progress. Therefore, the entire preparation progress can be simplified, the production cost can be reduced effectively, and the production efficiency can further improved.

The second pixel electrode 201 of the reflective region passes through the second insulating layer 214 via the drain contact hole 208 to connect with the drain electrode 206 of the TFT of the pixel unit. The first pixel electrode 211 of the transmissive region passes through the first and second insulating layers 213 and 214 via the common electrode contact hole 205 so as to connect with the common electrode of the pixel unit. The second pixel electrode 201' of the transmissive region is electrically connected to the second pixel electrode 201 of the reflective region.

The first pixel electrode 211 of the transmissive region and the second pixel electrode 201' of the transmissive region are provided alternately and insulated from each other. In this embodiment, the branches of the first pixel electrode 211 of the transmissive region is interleaved with the branches of the second pixel electrode 201' of the transmissive region, as shown in FIG. 3.

The first pixel electrode 211 of the transmissive region, the second pixel electrode 201' of the transmissive region, and the second pixel electrode 201 of the reflective region are transparent electrodes, and for example, made from ITO (Indium Tin Oxide), IZO (Indium Zinc Oxide), or the like.

The transflective TFT array substrate according to the present embodiment is bonded with the color filter substrate to form a liquid crystal panel. In operation, in the reflective region 21 of each pixel unit, the liquid crystal is driven by a planar electric field produced between the second pixel electrode 201 of the reflective region and the reflective electrode 212; light from the external entering the liquid crystal panel firstly passes through the liquid crystal layer, reflected by the reflective electrode 212, passes through the liquid crystal layer again (that is, the light is phase-modulated twice by the liquid crystal layer), and finally emits out from the liquid crystal panel and enters the eyes of users. In the transmissive region 22 of each pixel unit, the liquid crystal is driven by another planar electric field produced between the second pixel electrode 201' of the transmissive region and the first pixel electrode 211 of the transmissive region. Since there is no reflective electrode in the transmissive region 22, light emitted from the backlight source enters the liquid crystal panel, passes through the liquid crystal layer, emits from the display side in this transmissive region and then enters the eyes of users. That is, in the transflective TFT array substrate of the present embodiment, the liquid crystal is driven by a planar electric field between the second pixel electrode and the first pixel electrode in the reflective region, and the liquid crystal is driven by another planar electric field between the first pixel electrode of the transmissive region and the adjacent second pixel electrode of the transmissive region.

Figure 1:
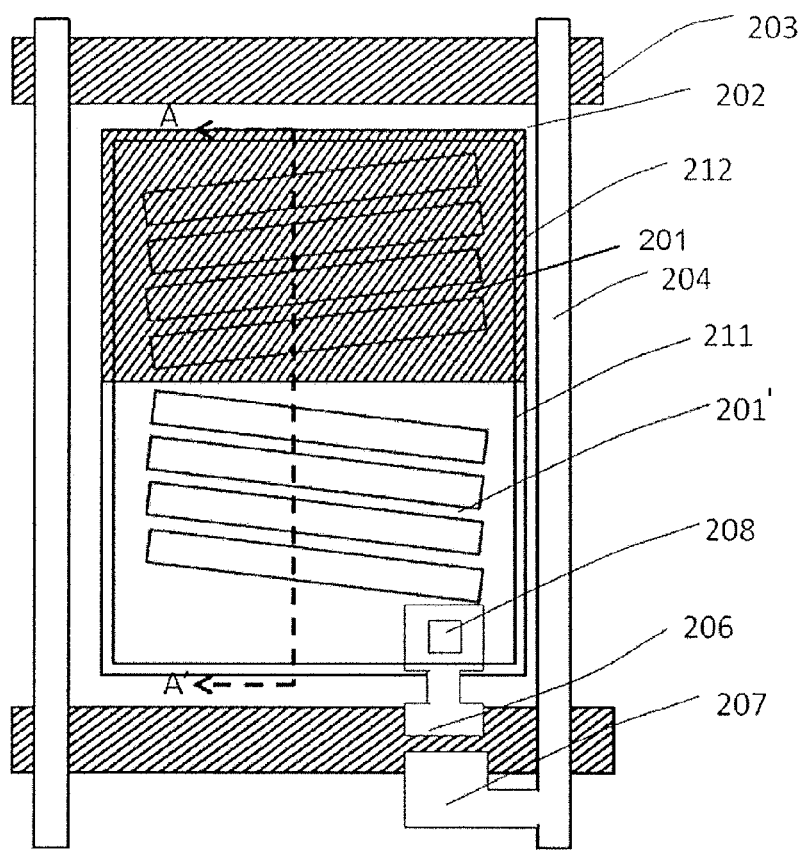
FIG. 1 is a planar schematic view of an array substrate of a transflective TFT-LCD with planar electric field mode in the related art.
Figure 2:
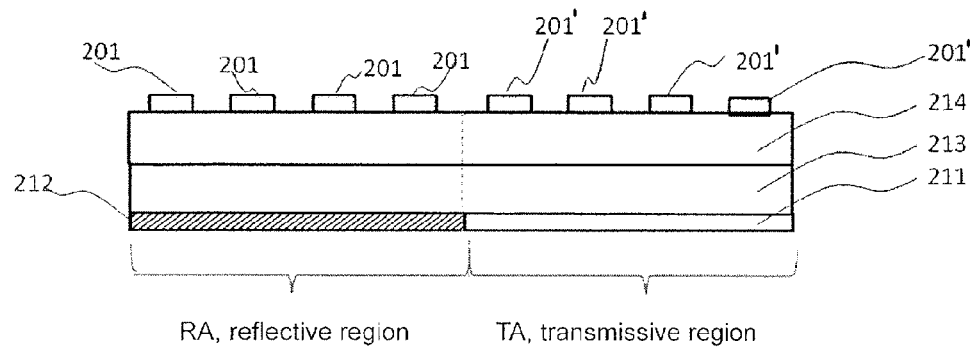
FIG. 2 is a cross-sectional view taken along line A-A' in FIG. 1.

Compared with the above-described technology in the related art, the transflective TFT array substrate of the present embodiment can omit a process for forming the first pixel electrode 211 of the transmissive region as shown in FIG. 2 to simplify the preparation process, and thus the electric field driven mode for the transmissive region and the reflective region is changed for displaying an image. In the reflective region, the reflective electrode 212 is provided for reflecting light, and is connected with the common electrode, so the planar electric field is formed between the second pixel electrode 201 of the reflective region and the reflective electrode 212 to make the liquid crystal rotating and thus perform display. However, in the present embodiment, the second pixel electrode 201' as shown in FIG. 2 is electrically divided to the first pixel electrode 211 of the transmissive region and the second pixel electrode 201' of the transmissive region; the first pixel electrode 211 of the transmissive region is connected to the common electrode via the common electrode contact hole 205, and the second pixel electrode 201' of the transmissive region is connected to the second pixel electrode 201 of the reflective region. Since the first pixel electrode 211 of the transmissive region and the second pixel electrode 201' of the transmissive region are provided alternately in the same layer and spaced from each other, the another planar electric field is formed between the first pixel electrode 211 of the transmissive region and the second pixel electrode 201' of the transmissive region so as to drive the liquid crystal for displaying images. Therefore, the transflective displaying is achieved by the combination of the two kinds of planar electric fields, and the preparation process is also simplified.

Since the electric fields for driving the liquid crystal in the transmissive region 22 and the reflective region 21 are different from each other, the electric field intensity in the transmissive region 22 and the reflective region 21 may be also different for each other. In an example, a distance between the first pixel electrode 211 of the transmissive region and the adjacent second pixel electrode 201' of the transmissive region is larger than that between two adjacent tranches of the second pixel electrodes 201 of the reflective region. The reason lies in that: in the reflective region, the liquid crystal is driven by the planar electric field between the second pixel electrodes 201 of the reflective region and reflective electrode 212, this planar electric field covers the whole reflective region, so not only the liquid crystal between two adjacent tranches of the second pixel electrodes 201 of the reflective region, but also the liquid crystal above the second pixel electrode 201 of the reflective region are driven by the planar electric field. Therefore, the liquid crystal in almost whole reflective region can be used to display images. In the transmissive region, the liquid crystal is driven by another planar electric field produced between the first pixel electrode 211 of the transmissive region and the second pixel electrode 201' of the transmissive region, this another planar electric field only exists between the electrodes, so only the liquid crystal located between the first pixel electrode 211 of the transmissive region and the second pixel electrode 201' of the transmissive region can contribute to the transmissivity of the region, while the liquid crystal located above the first pixel electrode 211 of the transmissive region and the second pixel electrode 201' of the transmissive region is hardly effected by the electric field, so do not contribute to the transmission. Therefore, the distance between the first pixel electrode 211 of the transmissive region and the second pixel electrode 201' of the transmissive region may be designed to be larger, so that the ratio of the area occupied by the first pixel electrode 211 of the transmissive region and the second pixel electrode 201' of the transmissive region is relatively reduced, thereby improving the transmission of the transmissive region in operation. Generally, the distance between two adjacent second pixel electrodes 201 of the reflective region may be 3 μm~7 μm, and the distance between the first pixel electrode 211 of the transmissive region and the second pixel electrode 201' of the transmissive region may be 7 μm~10 μm.

Figure 5:
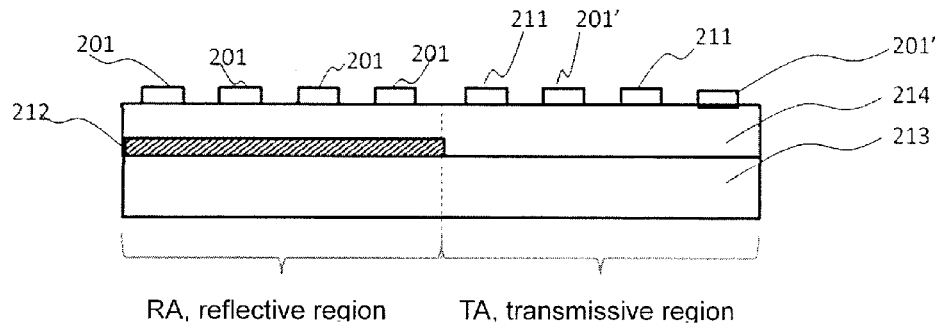
FIG. 5 is another cross-sectional view taken along line B-B' in FIG. 3.

In this embodiment, the reflective electrode 212 is disposed in the first metal layer, but the disclosed technology is not limited thereto. In another embodiment of the disclosed technology, as shown in FIG. 5, the reflective electrode 212 of each pixel unit is disposed in the second metal layer, that is, in the same layer as the data lines, the source electrodes 207, and the drain electrodes 206, and further is connected to the common electrode of the pixel unit via the reflective electrode contact hole which penetrates the first insulating layer 213. The operation principle of this embodiment is same as that of the previous described embodiment, so the detail is not repeated herein.

In addition, according to the above described principle, the array substrate of the embodiments of the disclosed technology drives the liquid crystal by the one kind of electric field formed between the second pixel electrode 201 of the reflective region and the reflective electrode 212 and the another kind of electric field formed between the second pixel electrode 201' of the transmissive region and the first pixel electrode 211 of the transmissive region. For energizing these electrodes and forming the electric fields between these electrodes, the connection configuration between these electrodes is not limited to above described structure in the present embodiment. For example, in another embodiment of the disclosed technology, the reflective electrode 212 and the first pixel electrode 211 of the transmissive region are connected to the drain electrode 206 of the TFT of the corresponding pixel unit; the second pixel electrode 201 of the reflective region is connected to the common electrode, the second pixel electrode 201' of the transmissive region is connected to the second pixel electrode 201 of the reflective region, the first pixel electrode 211 of the transmissive region is provided alternately and insulated from the second pixel electrode 201' of the transmissive region. The operation principle of this embodiment is same as that of the previous described embodiment, so the detail is not repeated herein.

Figure 6:
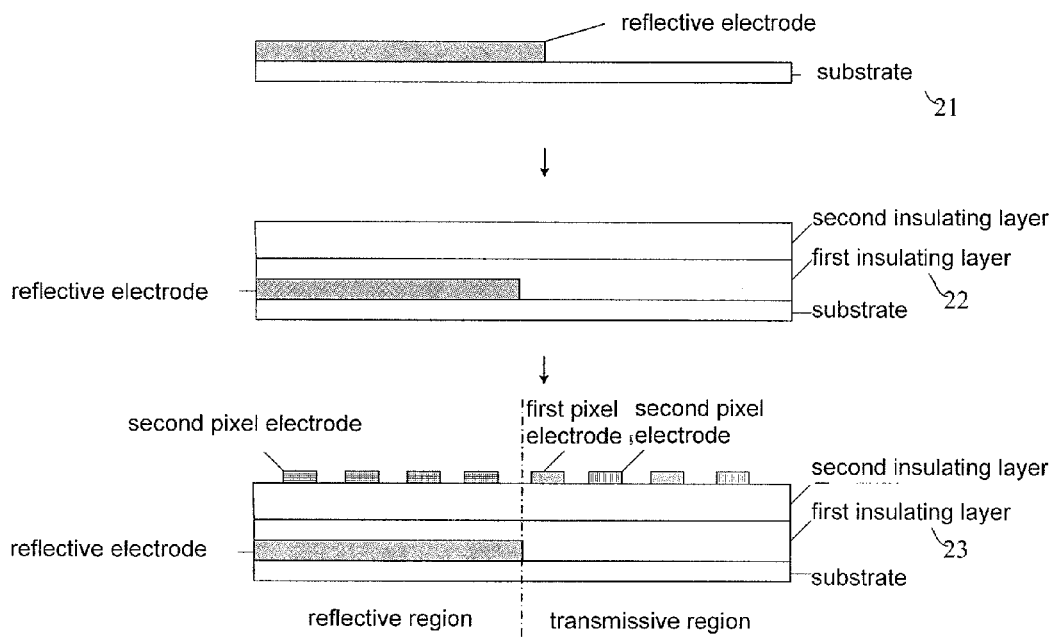
FIG. 6 is a schematic flowchart view of a method for preparing the transflective TFT array substrate according to an embodiment of the disclosed technology.

Accordingly, another embodiment of the disclosed technology also provides a method for manufacturing the above transflective TFT array substrate, as shown in FIG. 6, which comprises the following steps.

Step 11, depositing a metal thin film on a base substrate, and patterning the metal thin film to form a reflective electrode of a reflective region of a pixel unit.

Step 12, forming a second pixel electrode of the reflective region and first and second pixel electrodes of a transmissive region of the pixel unit on the base substrate on which the reflective electrode of the reflective region has been formed.

The second pixel electrode of the reflective region and the first and second pixel electrodes of the transmissive region are formed in a same pixel electrode layer.

Since the first and second pixel electrodes of the transmissive region are located in the same layer, the method for manufacturing the transflective TFT array substrate according to the embodiment of the disclosed technology can simultaneously form the first and second pixel electrodes of the transmissive region by one patterning process. Therefore, the preparation progress is simplified, and the manufacturing cost is reduced, thereby the production efficiency is further improved.

The method for manufacturing the transflective TFT array substrate according to the embodiment of the disclosed technology is described in detail by taking the preparation process of the transflective TFT array substrate shown in FIG. 4 as an example. In FIG. 6, the method of the embodiment comprises the following steps.

Step 20, depositing a first metal thin film on a base substrate, and patterning the first metal thin film by a first patterning process to form a first metal layer comprising gate lines and a gate electrode, a common electrode, and a reflective electrode of a reflective region of each pixel unit.

The reflective electrode of the reflective region is connected to the common electrode.

Step 21, depositing a gate insulating thin film on the first metal layer to form a gate insulating layer (first insulating layer).

Step 22, forming a drain contact hole and a common electrode contact hole for each pixel unit on the base substrate on which the first metal layer and the gate insulating layer have been formed.

In on the example, this step may further comprise the following process.

Step 220, depositing a second metal thin film on the base substrate on which the first metal layer and the gate insulating layer have been formed, and patterning the second metal thin film by a second patterning process to form a second metal layer comprising data lines, source electrodes and drain electrodes; and Step 221, depositing a passivation thin film on the second metal layer to form a passivation layer (second insulating layer), and patterning the passivation layer to form a drain contact hole and a common electrode contact hole for each pixel unit.

Step 23, depositing a pixel electrode thin film on the base substrate on which the drain contact hole and the common electrode contact hole have been formed, and patterning the pixel electrode thin film to form a second pixel electrode of the reflective region and first and second pixel electrodes of a transmissive region.

In each pixel unit, the second pixel electrode of the reflective region is connected to the second pixel electrodes of the transmissive region, the second pixel electrode of the reflective region is connected to the drain electrode via the drain contact hole, the second pixel electrode of the transmissive region is provided alternately and insulated from the first pixel electrode of the transmissive region, and the first pixel electrode of the transmissive region is connected to the common electrode via the common electrode contact hole.

Figure 7:
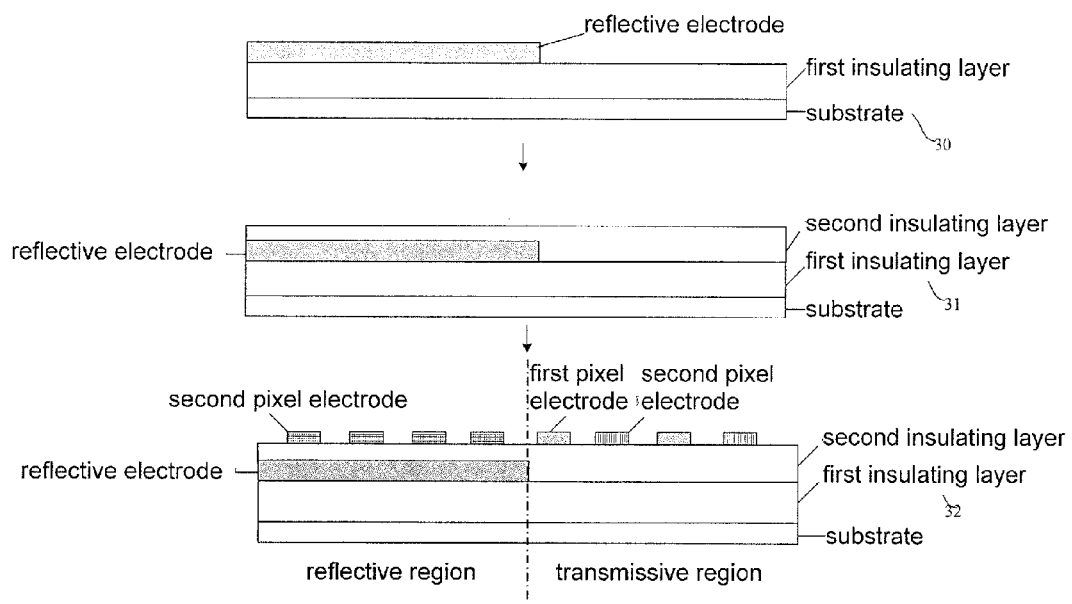
FIG. 7 is a schematic flowchart view of a method for preparing the transflective TFT array substrate according to an embodiment of the disclosed technology.

The method for manufacturing the transflective TFT array substrate according to the embodiment of the disclosed technology is described in detail by taking the preparation process of the transflective TFT array substrate shown in FIG. 5 as an example. In FIG. 7, the method of the embodiment comprises the following steps.

Step 30, forming a reflective electrode on a base substrate.

In an example, this step comprises the following processes.

Step 301, depositing a first metal thin film on the base substrate, and patterning the first metal thin film to form a first metal layer comprising gate lines and a gate electrode and a common electrode for each pixel;

Step 302, depositing a gate insulating thin film on the first metal layer to form a gate insulating layer (first insulating layer); and Step 303, depositing a second metal thin film on the substrate on which the first metal layer and the gate insulating layer have been formed, and patterning the second metal thin film by a second patterning process to form a second metal layer comprising data lines and a source electrode, a drain electrode, and a reflective electrode for each pixel unit.

Step 32, depositing a passivation thin film on the second metal layer to form a passivation layer (second insulating layer), and patterning the passivation layer to form a reflective electrode contact hole, a drain contact hole and a common electrode contact hole for each pixel unit.

Step 33, depositing a pixel electrode thin film on the base substrate on which the drain contact hole and the common electrode contact hole have been formed, and patterning the pixel electrode thin film to form a second pixel electrode of the reflective region and first and second pixel electrodes of a transmissive region of each pixel unit;

The second pixel electrode of the reflective region is connected to the second pixel electrodes of the transmissive region, the second pixel electrode of the reflective region is connected to the drain electrode via the drain contact hole, the second pixel electrode of the transmissive region is produced alternately and insulated from the first pixel electrode of the transmissive region, the first pixel electrode of the transmissive region is connected to the common electrode via the common electrode contact hole, and the reflective electrode is connected to the common electrode via the reflective electrode contact hole.

In practice, the order of the respective layers can be changed, as long as the TFT can be normally driven. For example, the metal layer comprising the gate lines and the data lines may be changed into a higher layer or a lower layer, or the like. The reflective electrode may be made of aluminum (Al) or aluminum alloy, or further Al electrode can be surface-treated to form an aluminum nitride layer which has better reflection properties.

The above description is only the detail embodiments of the disclosed technology, but the scope of the disclosed technology is not limited thereto. The variations or alternations made by those skilled in the art within the disclosure of the disclosed technology are intended to be comprised within the scope of the disclosed technology. Therefore, the scope of the disclosed technology is defined by the scope of the claims.

What is claimed is:

1. A transflective thin film transistor array substrate, comprising:
    a base substrate,
    first and second metal layers on the base substrate, and
    a first insulating layer disposed between the first and second metal layers,
    wherein the first metal layer comprises gate lines, the second metal layer comprises data lines perpendicular to the gate lines, pixel units are defined by the gate lines and the data lines, and each pixel unit comprises a thin film transistor and a common electrode and is divided into a reflective region and a transmissive region,
    wherein, the reflective region comprises a reflective electrode and a second pixel electrode of the reflective region, the transmissive region comprises first and second pixel electrodes of the transmissive region; and
    the second pixel electrode of the reflective region and the first and second pixel electrodes of the transmissive region are provided in one pixel electrode layer;
    wherein a distance between the first pixel electrode of the transmissive region and the adjacent second pixel electrode of the transmissive region is larger than a distance between two adjacent branches of the second pixel electrodes of the reflective region,
    wherein the distance between the two adjacent branches of the second pixel electrodes of the reflective region is 3 μm to 7 μm, and the distance between the first pixel electrode of the transmissive region and the adjacent second pixel electrode of the transmissive region is 7 μm to 10 μm.

2. The array substrate of claim 1, wherein the reflective electrode is provided in the first or second metal layer, and
    the pixel electrode layer is provided above the second metal layer, and a second insulating layer is provided between the pixel electrode layer and the second metal layer.

3. The array substrate of claim 2, wherein the reflective electrode and the first pixel electrode of the transmissive region are connected to the common electrode, the second pixel electrode of the reflective region is connected to a drain electrode of the TFT, and the first pixel electrode of the transmissive region is provided alternately and insulated from the second pixel electrode of the transmissive region.

4. The array substrate of claim 1, wherein the reflective electrode and the first pixel electrode of the transmissive region are connected to the drain electrode, the second pixel electrode of the reflective region is connected to the common electrode, the second pixel electrode of the transmissive region is connected to the second pixel electrode of the reflective region, and the first pixel electrode of the transmissive region is provided alternately and insulated from the second pixel electrode of the transmissive region.

5. The array substrate of claim 1, wherein the second pixel electrode of the reflective region and the first and second pixel electrodes of the transmissive region are transparent electrodes.

6. The array substrate of claim 1, wherein material of the reflective electrode comprises aluminum or aluminum alloy.

7. The array substrate of claim 1, wherein the reflective electrode comprises aluminum nitride formed by surface-treatment.

* * * * *